Patented Mar. 10, 1953

2,631,120

UNITED STATES PATENT OFFICE 2,631,120

PRODUCTION OF RIBOFLAVIN BY ASHBYA GOSSYPII

Samuel C. Beesch, Columbus, Ohio, and Melvin C. Firman, Philadelphia County, Pa., assignors to Publicker Industries Inc., Philadelphia, Pa., a corporation of Pennsylvania No Drawing. Application May 25, 1948, Serial No. 29,196

9 Claims. (Cl. 195—28)

The present invention relates to a process for the biochemical synthesis of riboflavin. More particularly it is concerned with the production of riboflavin by the action of the fungus known as *Ashbya gossypii* on a novel type of mash.

The above mentioned organism has previously been employed in the synthesis of riboflavin from liquid media containing animal protein, corn steep liquor, and dextrose. While relatively good yields of riboflavin are obtainable by employing mashes of the aforesaid type it has, in the past, been assumed that a source of animal protein, a relatively expensive ingredient of the mash, was essential for the procurement of satisfactory results. Such animal protein, thought to be essential for successful fermentation, has been supplied in the form of peptone, beef extract, and stick liquor. The utilization of peptones, industrialwise, is costly and in the case of beef extract and stick liquor a preliminary enzymatic hydrolysis with papain is required before such materials can be used, thereby further increasing the operation cost.

It has now been discovered that the animal protein which has heretofore been regarded as an indispensable ingredient of mashes employed in the production of riboflavin by the action of the organism *Ashbya gosspyii* thereon can be replaced entirely by cheap vegetable protein and it is to such vegetable protein containing mashes that the present invention is directed.

In utilizing the novel mashes of the present invention, the fermentation may be effected in accordance with any of several procedures known to the art. A suitable procedure for carrying out the fermentation consists essentially of fermenting with the fungus *Ashbya gossypii* under pure culture conditions a mash of the type contemplated by the present invention and having a predetermined pH. While fermentation is under way sterile air is introduced in such a manner that the fungus and air are substantially completely dispersed throughout the mash. In order to avoid any possible contamination from the atmosphere during the fermentation a positive operation pressure is preferably maintained over the surface of the mash. Toward the conclusion of the fermentation the pH will ordinarily be found to be between 6.5 and 7.5. After fermentation is complete the mash is filtered by any convenient method and the riboflavin present in the filtrate may be recovered therefrom in accordance with any of several well known methods, for examples, by absorption on a suitable adsorbent material such as fuller's earth or adsorbent clay. The resulting adsorbate can then be treated in a known manner with a suitable elution solvent, as for example, that described in U. S. Patent No. 2,175,014 to Booher et al., to obtain the riboflavin in a substantially pure state.

The nutrient mashes of the present invention may vary in composition. In addition to the nutritive amount of vegetable protein present there is required from about 60% to about 75% of a metabolizable carbohydrate, based on the total weight of nutrients in the mash, and from about 15% to about 20% of a suitable natural source of amino acids and necessary growth factors such as are found in corn steep liquor. Suitable examples of metabolizable vegetable proteins are soy bean meal, linseed meal, cotton seed meal, citrus pulp, thin grain ethyl stillage (ethyl solubles), i. e., the spent mash from whiskey or yeast ethyl alcohol fermentations, and the like. On the other hand we have found that, at least under the conditions investigated, vegetable proteins such as those obtainable from barley malt, corn and malted corn are unsuitable for riboflavin production utilizing *Ashbya gosspyii* as the fermentative organism. The carbohydrates employed may be any of those previously used in mashes fermented by *Ashbya gossypii,* such as for example, glucose.

In general, the total nutrient content of the mash may vary from between about 3.5% to about 8%, depending upon the composition of the particular mash utilized. Obviously it is desirable to employ mashes having the maximum initial concentration of nutrient substances practicable under the circumstances in order to conserve operating space and equipment. Mashes having a nutrient content appreciably in excess of 8%, however, are generally not suited for satisfactory growth of the organism and, hence from a practicable standpoint, at least, are undesirable. For most purposes it is preferred to employ mashes having an initial nutrient content of about 6% since mashes of such concentration seem to be favorable both from the standpoint of growth of the organism and relative amounts of riboflavin produced. In regard to the nutrient content of the mash, however, it should be understood that if the amount of nutrient present decreases as the fermentation proceeds, such content may be intermittently increased to the original value by the addition of the required nutrient substances as many times as may be found necessary or desirable under the circumstances.

Aeration of the mash during the fermentation may be accomplished by any desired means, the chief requirements being that the air employed should be sterile and that it be introduced in quantities and in a degree of dispersion sufficient for a rapid growth of the fungus. In certain instances it may even be found desirable to employ both aeration and moderate mechanical agitation in order to facilitate a more rapid and satisfactory growth of the fungus. Frequently, it has been found that such practice results in shorter fermentation periods, and is particularly found to be true when employing relatively small volumes of mash. In the case of larger volumes of mash, however, the organism will generally be observed to grow very satisfactorily without mechanically agitating the mash provided adequate amounts of sterile air are introduced throughout the fermentation operation. A convenient method for aerating comparatively large volumes of such mashes consists of introducing sterile air through a dispersion unit or a series of such units, thereby causing the air to be divided into bubbles of small diameter. Although the rate at which such aeration should occur may vary within relatively wide limits it has generally been found preferable to introduce it at a rate of from about 1.5 to about 2.0 cubic feet per minute per square foot of mash surface. While the above mentioned method of aerating the mash has been found particularly effective when employing the customary fermentation procedures, it should be understood that the term "aeration," as used in the present description as well as in the appended claims, is not to be restricted to such methods. For example, under certain conditions ample aeration can be effected by stirring, spraying the mash in the presence of an atmosphere of sterile air, or by shaking in an atmosphere of sterile air, the latter method being illustrated in the example which appears below.

The initial pH of the mashes employed in the present invention may vary from between about 5.5 to about 7.5, although for the majority of mashes it is preferable to utilize an initial pH of from about 6.0 to about 6.5. On completion of the fermentation the pH out of the mash is generally found to be from about 7.0 to 7.5.

In general the temperature at which fermentation may be effected can vary from about 20° C. to about 37° C. However, it has been found preferable to employ temperatures of from about 24° C. to about 29° C. At temperatures below 20° C. the fermentation rate is reduced to such an extent that only negligible amounts of riboflavin are produced while at temperatures in excess of about 37° C. the ability of the organism to produce riboflavin is greatly impaired.

The period required to carry fermentation to completion is, of course, dependent upon numerous factors such as temperature, the nutrient content of the particular mash fermented, the percentage of inoculant employed, etc. Usually the fermentation will be found to be complete within approximately five days after inoculation; however, in any given instance this time may readily be ascertained by periodic assays of mash samples for increasing riboflavin content.

The inoculant containing the fungus *Ashbya gossypii* may be prepared in accordance with a number of different methods; however, we have found the following procedure to be quite satisfactory: first a stock slant of an *Ashbya gossypii* culture is transferred to a slant composed of autolized yeast extract (0.3%), malt extract (3%), peptone (0.5%), dextrose (4.0%), and agar (2.0%), and grown twenty-four hours at 27° C. This culture is then transferred from the slant and grown in a medium consisting essentially of peptone (1.0%), corn steep solids (1.0%) and dextrose (4.0%), at a pH of about 7.0 for twenty-four hours at 27° C. on a shaking machine. The resulting inoculum is then used in a concentration of about 1.0%. Alternatively, inoculation of the mashes of the present invention may be satisfactorily effected by means of spore inoculation in accordance with the procedure described and claimed in copending application U. S. Serial No. 17,124, filed March 25, 1948, by Samuel C. Beesch and M. Shon. In accordance with this process large volumes of mash are inoculated with a spore inoculum generally in a dilution of from about one part of inoculum to 160,000 parts of mash to one part of inoculum to 320,000 parts of mash. This particular procedure is found to be especially advantageous where the organism employed is known to form mutant strains which produce very little riboflavin.

While the riboflavin present in the liquors resulting from the fermentation process of the present invention may be recovered therefrom by means of any of several standard procedures, some of which have been previously mentioned, a further advantage of the present invention constitutes the fact that dried residues can be secured containing riboflavin in amounts of from between about 800 to 25,000 $\mu$g. per gram of dried material by concentrating said liquors in accordance with well established procedures. However, care should be exercised in the concentration steps to avoid temperatures and pH values which would result in substantial destruction of the riboflavin activity of the resulting residue. Generally, the residues rich in riboflavin can be secured by first concentrating the fermented mash through evaporation, such as for example, by the use of multiple effect evaporators, after which the resulting concentrate may be dried to a solid mass by evaporation in pans, or by the use of rotary drum driers, vacuum driers, spray driers, or the like. In general it may be said that any of the common methods for recovering solids from liquids which would not tend to adversely affect the riboflavin present therein, may be employed for this purpose. It will, therefore, be evident that the above mentioned feature of the present invention is capable of numerous modifications, the only essential requirements being that the recovery step is carried out in a manner not harmful to the riboflavin contained in the resulting residue.

The present invention may be more specifically illustrated by the following example:

EXAMPLE

In a series of experiments, mashes were prepared by adding the desired vegetable protein, corn steep, and dextrose to distilled water in the concentrations indicated below. Control mashes were also prepared in which peptone, as employed in the standard mashes, was substituted for the vegetable protein. The mashes were first adjusted to a pH of 6.5 and sterilized for about fifteen minutes at 15 lbs. gauge pressure, after which they were cooled to 27° C. and inoculated with 1.0% of an active culture of *Ashbya gossypii*. The depth of the mash in the fermentation vessel was about 1 inch, an atmosphere of sterile air being maintained thereover at all times. The vessel containing the inoculated mash was placed on a standard platform shaker and agitated in order to secure abundant aeration and incubated for a period of five days at 27° C. The results appearing below in tabular form show the number of μg. of riboflavin per ml. produced from both standard type mashes and mashes in which vegetable protein was substituted for animal protein.

*Table*

| Composition of Mash | μg. Riboflavin per ml. | Initial pH | Final pH |
| --- | --- | --- | --- |
| 1% corn steep (solids)<br>1% soy bean meal<br>4% dextrose | [2] 610 | 6.5 | 7.2 |
| 1% corn steep (solids)<br>1% ethyl solubles<br>4% dextrose | [3] 420 | 6.5 | 7.2 |
| 1% corn steep (solids)<br>1% cottonseed meal<br>4% dextrose | [2] 352 | 6.5 | 7.5 |
| 1% corn steep (solids)<br>1% linseed meal<br>4% dextrose | [3] 310 | 6.5 | 7.3 |
| 1% corn steep (solids)<br>1% orange pulp meal<br>4% dextrose | [3] 343 | 6.5 | 7.2 |
| 1% peptone [1]<br>1% corn steep (solids)<br>4% dextrose | [2] 525 | 6.5 | 7.5 |

[1] Control mash—average of 4 fermentations.
[2] Average of 4 fermentations.
[3] Average of 3 fermentations.

What we claim is:

1. A process for the production of riboflavin which comprises forming a nutrient mash containing as its principal nutrients a metabolizable carbohydrate, corn steep liquor, and a substantially unhydrolyzed protein selected from the group consisting of ethyl solubles, cottonseed meal, linseed meal, citrus pulp and soy bean meal, to the exclusion of degraded proteinaceous material and of animal protein, and fermenting the mash with the fungus *Ashbya gossypii* while maintaining the mash in a state of aeration sufficient to disperse the fungus and air throughout the mash.

2. A process according to claim 1 wherein the mash is adjusted to a pH of about 5.5–7.5 prior to the fermentation and wherein the fermentation is carried out at a temperature of about 20–37° C.

3. A process according to claim 1 wherein the unhydrolyzed vegetable protein is soy bean meal.

4. A process according to claim 1 wherein the unhydrolyzed vegetable protein is ethyl solubles.

5. A process according to claim 1 wherein the unhydrolyzed vegetable protein is cottonseed meal.

6. A process according to claim 1 wherein the unhydrolyzed vegetable protein is linseed meal.

7. A process according to claim 1 wherein the unhydrolyzed vegetable protein is citrus pulp.

8. A process according to claim 1 wherein the mash is adjusted to a pH of about 6–7 prior to fermentation and wherein the fermentation is carried out at a temperature of about 26–30° C. and wherein air is introduced at a rate of about 1.5–2.0 cubic feet per minute per square foot of mash surface.

9. A process for the production of riboflavin which comprises forming a nutrient mash containing as its principal nutrients about 60–75% of a metabolizable carbohydrate, about 15–20% of corn steep liquor, and about 15–20% of a substantially unhydrolyzed protein selected from the group consisting of ethyl solubles, cottonseed meal, linseed meal, citrus pulp and soy bean meal, to the exclusion of degraded proteinaceous material and of animal protein, said percentages being based on the weight of total nutrients present in the mash, adjusting the pH of the mash to about 5.5–7.5, and fermenting the mash with the fungus *Ashbya gossypii* at a temperature of about 20–37° C. while maintaining the mash in a state of aeration sufficient to disperse the fungus and air throughout the mash.

SAMUEL C. BEESCH.
MELVIN C. FIRMAN.

REFERENCES CITED

The following references are of record in the file of this patent:

UNITED STATES PATENTS

| Number | Name | Date |
| --- | --- | --- |
| 2,445,128 | Tanner | July 3, 1948 |
| 2,461,922 | Rake | Feb. 15, 1949 |

OTHER REFERENCES

Tilden, Jour. Bact., 1939, page 629.
Brewer, Jour. Bact., October 1943, pages 395–396.
McMahon, Jour. Bact., April 1944, pages 400–401.
Schopfer, Helvetica Chimica, Acta V, XXVII, Aug. 1, 1944, pages 1017–1031.
Wickerham, Arch. Biochem., vol. 9, No. 1, Jan. 1946, pages 95 to 98.
Tanner, Jour. Bact., 54 (1947), pages 38–39.